United States Patent
Lambert et al.

(10) Patent No.: US 9,118,911 B2
(45) Date of Patent: Aug. 25, 2015

(54) VARIABLE DISPARITY THREE-DIMENSIONAL (3D) DISPLAY SYSTEM AND METHOD OF OPERATING THE SAME

(71) Applicant: DELPHI TECHNOLOGIES, INC., Troy, MI (US)

(72) Inventors: David K. Lambert, Sterling Heights, MI (US); Frederick F. Kuhlman, Kokomo, IN (US); Dwadasi H. R. Sarma, West Lafayette, IN (US)

(73) Assignee: Delphi Technologies, Inc., Troy, MI (US)

( * ) Notice: Subject to any disclaimer, the term of this patent is extended or adjusted under 35 U.S.C. 154(b) by 346 days.

(21) Appl. No.: 13/761,238

(22) Filed: Feb. 7, 2013

(65) Prior Publication Data

US 2014/0218487 A1    Aug. 7, 2014

(51) Int. Cl.
  *H04N 13/02*    (2006.01)
  *H04N 13/04*    (2006.01)
  *H04N 13/00*    (2006.01)

(52) U.S. Cl.
  CPC ....... *H04N 13/0454* (2013.01); *H04N 13/0022* (2013.01); *H04N 2213/002* (2013.01)

(58) Field of Classification Search
  CPC ............ H04H 13/0429; H04H 13/044; H04H 13/0431; H04H 13/0434; H04H 13/0436; H04H 13/0438
  USPC .......................... 348/51–59; 345/419; 600/27
  See application file for complete search history.

(56) References Cited

U.S. PATENT DOCUMENTS

| | | | |
|---|---|---|---|
| 6,369,952 B1 * | 4/2002 | Rallison et al. | 359/630 |
| 7,918,781 B1 | 4/2011 | Smyth et al. | |
| 2003/0073922 A1 | 4/2003 | Miller et al. | |
| 2004/0102676 A1 | 5/2004 | Brendley et al. | |
| 2005/0204820 A1 * | 9/2005 | Treiber et al. | 73/649 |
| 2006/0238442 A1 | 10/2006 | Uhlhorn et al. | |
| 2007/0147671 A1 * | 6/2007 | Di Vincenzo et al. | 382/128 |
| 2009/0046140 A1 | 2/2009 | Lashmet et al. | |

(Continued)

FOREIGN PATENT DOCUMENTS

| | | |
|---|---|---|
| WO | 2012/036056 A1 | 3/2012 |
| WO | 2012/135837 A1 | 10/2012 |

OTHER PUBLICATIONS

David K. Lambert: "3D Glasses-free Displays for Automotive Applications", Sep. 7, 2011, 19 pages.

(Continued)

*Primary Examiner* — Victor Kostak
(74) *Attorney, Agent, or Firm* — Lawrence D. Hazelton

(57) ABSTRACT

A variable disparity three-dimensional (3D) display system and method of processing a variable disparity three-dimensional (3D) image shown on a display to reduce motion sickness of a person viewing the display. The system includes a motion detector configured to determine a motion value that characterizes motion of a display, and an image processor configured to adjust incrementally a disparity amount of a 3D image shown by the display based on the motion value in order to reduce motion sickness of a person viewing the display. The method includes determining a motion value that characterizes motion of a display, and adjusting a disparity amount of a 3D image shown by the display incrementally based on the motion value in order to reduce motion sickness of a person viewing the display.

23 Claims, 4 Drawing Sheets

(56) References Cited

U.S. PATENT DOCUMENTS

| | | |
|---|---|---|
| 2009/0179987 A1* | 7/2009 | Kim .............................. 348/142 |
| 2011/0128351 A1* | 6/2011 | Newton et al. .................. 348/43 |
| 2011/0221750 A1* | 9/2011 | Sato et al. ..................... 345/419 |
| 2012/0038743 A1 | 2/2012 | Su et al. |
| 2012/0182397 A1* | 7/2012 | Heinzle et al. ................. 348/47 |
| 2012/0200668 A1 | 8/2012 | Maruyama et al. |
| 2013/0106844 A1* | 5/2013 | Hong et al. ................... 345/419 |

OTHER PUBLICATIONS

Schoettle, et al.: "In-Vehicle Video and Motion Sickness", University of Michigan Transportation Research Institute, UMTRI-2009-6, Mar. 2009, 25 pages.

Lang, et al.: "Nonlinear Disparity Mapping for Stereoscopic 3D", published 2010, 10 pages.

Donohew, et al.: "Motion Sickness: Effect of the Frequency of Lateral Oscillation", Aviation, Space, and Environmental Medicine, vol. 75, No. 8, Aug. 2004, pp. 649-656.

Georgoulas, et al.: "Real-time disparity map computation module", ScienceDirect, Microprocessors and Microsystems 32 (2008), pp. 159-170.

Alan J. Benson: "Motion Sickness", Medical Aspects of Harsh Environments, vol. 2, Chapter 35, published 2002, pp. 1048-1083.

David K. Lambert: "On-Board 3D Displays and Viewer Comfort", Aug. 23, 2012, 17 pages.

Fehn, et al.: "Interactive 3-DTV—Concepts and Key Technologies", Proceedings of the IEEE, vol. 94, No. 3, Mar. 2006, pp. 524-538.

Smolic, et al.: "Three-Dimensional Video Postproduction and Processing", Proceedings of the IEEE, vol. 99, No. 4, Apr. 2011, pp. 607-625.

Advanced Television Systems Committee, Inc.: "ATSC Planning Team 1 Interim Report: Part 1: Visual Sciences, Part 2: 3D Technology", Feb. 28, 2011, 43 pages.

\* cited by examiner

VARIABLE DISPARITY THREE-DIMENSIONAL (3D) DISPLAY SYSTEM AND METHOD OF OPERATING THE SAME

TECHNICAL FIELD OF INVENTION

This disclosure generally relates to three-dimensional (3D) displays, and more particularly relates to a 3D display that adjusts incrementally a disparity amount of a 3D image shown by the display based on motion of the display in order to reduce motion sickness of a person viewing the display.

BACKGROUND OF INVENTION

Many individuals enjoy watching video while traveling, and some prefer 3D video over 2D video. It is known that a person may experience headache, nausea, and/or dizziness when viewing two-dimensional (2D) images on a display such as a tablet while traveling in an automobile, a plane, a bus, or a subway. It has been observed that persons viewing three-dimensional (3D) images while traveling may be even more susceptible to such unpleasant symptoms.

SUMMARY OF THE INVENTION

In accordance with one embodiment, a variable disparity three-dimensional (3D) display system is provided. The system includes a motion detector and an image processor. The motion detector is configured to determine a motion value that characterizes motion of a display. The image processor is configured to adjust incrementally a disparity amount of a 3D image shown by the display based on the motion value in order to reduce motion sickness of a person viewing the display.

In another embodiment, a method of processing a three-dimensional (3D) image shown on a display to reduce motion sickness of a person viewing the display is provided. The method includes the step of determining a motion value that characterizes motion of a display. The method also includes the step of adjusting a disparity amount of a 3D image shown by the display incrementally based on the motion value in order to reduce motion sickness of a person viewing the display.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
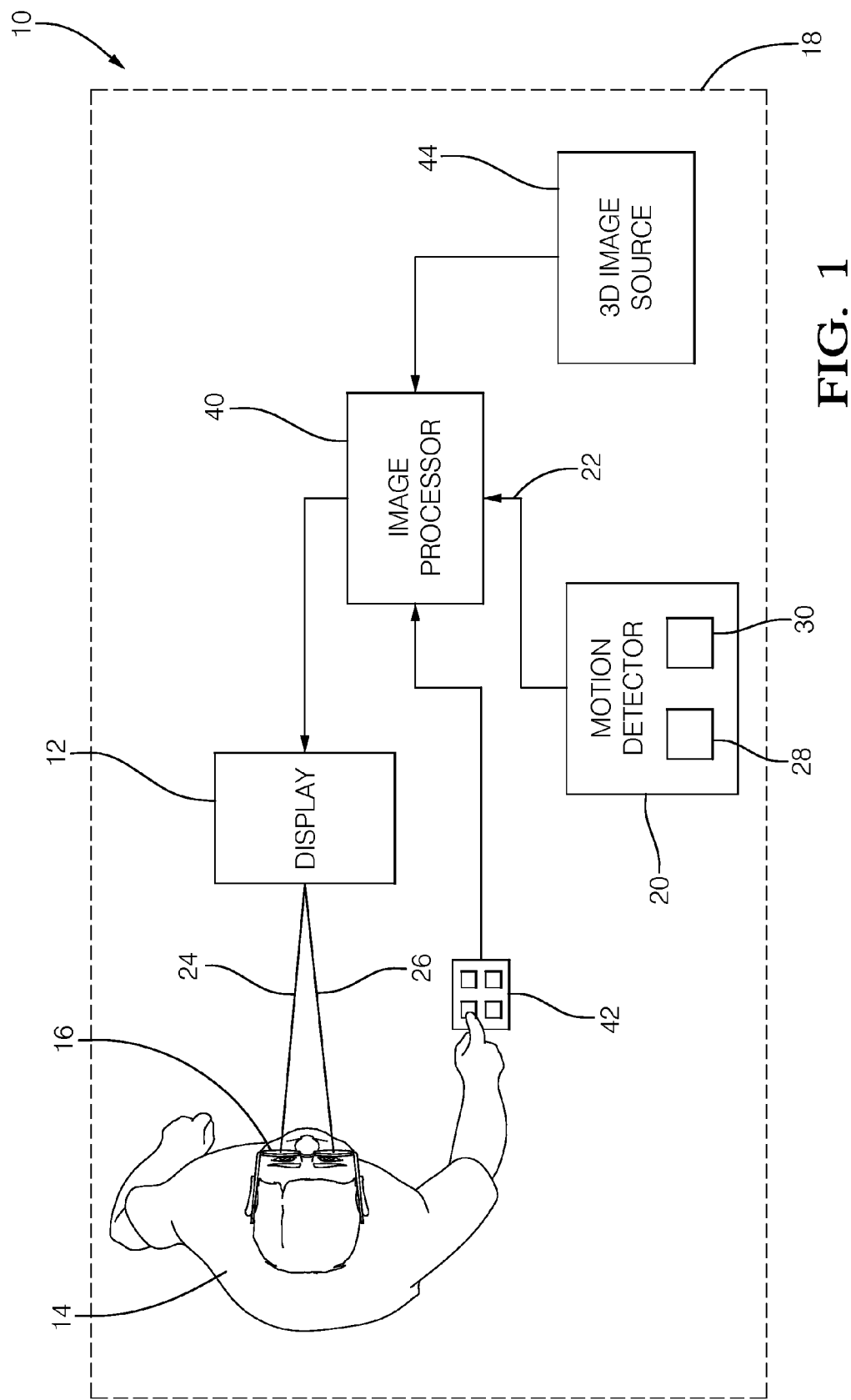
FIG. 1 is a diagram of a display system in accordance with one embodiment.

Viewing three-dimensional (3D) images on a flat display relies on the person viewing the display seeing distinct left-eye and right-eye images, where the differences in the images are interpreted by the person's brain to provide the illusion of variable depth or variable distance to objects displayed in the images. The difference in position between corresponding points in the left-eye and right-eye images is often referred to as disparity. If the disparity is too large, the viewer is unable to fuse the two images and a double image is seen. Even if the maximum disparity is small enough for the viewer to fuse the two images, viewing 3D video over a period of time can lead to feelings of discomfort, similar to the symptoms of motion sickness. While not subscribing to any particular theory, the discomfort produced by viewing a 3D image is believed to be related to the disparity between left-eye image and the right-eye image. The discomfort can be changed by presenting to the viewer a 3D image based on a new 2D image pair, in which the disparity of each pair of corresponding points in the original image pair is reduced. For example, the disparity can be multiplied by a factor G. This image transformation causes a change in the apparent depth of the 3D image. If G=1, the perceived depth range of the 3D image is the actual depth range. If G=0, the perceived depth range is compressed to a plane. Known image processing techniques can be used to effect the transformation of the 2D image pair for values of G between 0 and 1. If the disparity factor is set to zero (G=0), the left-eye and right-eye images are the same, so the viewer sees a 2D image, not a 3D image. More generally, the reduction in disparity of corresponding points in the 2D image pair does not need to be described by a linear factor as long as the relationship is monotonic. As described herein the quantity that sets the disparity transformation is disparity amount.

If the disparity amount is set to one (1), the disparity between the left-eye and right-eye images is unchanged from the original 3D image image by the image transformation. If the disparity amount is set to zero (0), the left-eye and right-eye images are the same after the image transformation. Applicants discovered that the sensitivity to motion sickness experienced by persons viewing 3D images may be reduced if the disparity amount is incrementally or partially reduced. For example, if the 3D image is processed to have one-half (½) of the disparity of the original 3D image, the severity of the motion sickness symptoms are reduced. As used herein, 'incrementally' means that the disparity amount or the disparity factor G is adjusted to one or more values between zero and one. As such, the system and method described herein improves on display systems that merely switch between a 3D image display mode and a 2D image display mode.

It is recognized that several motion compensation techniques for 2D images have been proposed, but these are generally directed to moving the image being displayed relative to some frame of reference to reduce motion sickness. However, since 2D images do not have any disparity, such techniques are not comparable to the technique of adjusting incrementally the disparity amount of the 3D image, as described herein. It should also be appreciated that adjusting incrementally the disparity amount of the 3D image is an improvement over techniques that merely switch between a normal 3D display mode (disparity amount=1 or G=1) and a normal 2D display mode (disparity amount=0 or G=0). The improvement is that in instances when the disparity amount is some value between one (1) and zero (0), for example one-half (½), some of the 3D effect is preserved and available for the person viewing the display to enjoy. For 3D video originally taken with one camera translated relative to the other by approximately the average distance between a person's eyes (6.3 cm), most persons continue to perceive the modified image pair as 3D even with G=0.1.

FIG. 1 illustrates a non-limiting example of a variable disparity three-dimensional (3D) display system, hereafter the system 10. In general, the system 10 includes a display 12 configured to display images to a person 14. The display 12 may be any kind of display suitable for displaying 2D and 3D images, such as an organic light emitting diode (OLED) type display, or a liquid crystal device (LCD) type display. The display 12 may cooperate with 3D glasses 16 to display 3D images to the person 14, or the display 12 may include features (not shown) known in the art for displaying 3D images to the person 14 without relying on 3D glasses. In general, the system 10 operates to display a left-eye image 24 to the left eye of the person 14, and a right-eye image 26 to the right eye of the person 14. The display 12 may be part of a portable display device such as a tablet, smart phone, laptop computer, or other personal communications device, or the display 12 may be installed in a vehicle 18, such as an automobile, train, or aircraft for providing entertainment or information to the person 14 traveling in the vehicle 18.

The system 10 includes a motion detector 20 configured to determine a motion value 22 that characterizes motion of a display 12. If the display 12 is part of a portable display device, the motion detector 20 may be integrated into the device and so is generally subject to the same motion as the display 12. If the display 12 is installed in the vehicle 18, the motion detector 20 may be attached or rigidly coupled to the display 12. Alternatively, the motion detector 20 may be installed elsewhere in the vehicle 18, and may be part of a vehicle motion detecting system such as a collision sensing system or a vehicle-stability control system. As will be explained in more detail below, the motion value 22 is used by the system 10 to, among other things, adjust the disparity amount of the left-eye image 24 and the right-eye image 26. By way of example and not limitation, as motion value 22 indicates increased motion of the display 12, the disparity between the left-eye image 24 and the right-eye image 26 is typically reduced or decreased.

In one embodiment, the motion detector 20 may include an accelerometer 28, such as a three-axis accelerometer that is commercially available from Analog Devices, Inc. headquartered in Norwood, Mass. The motion value 22 may be based directly on the output signals from the accelerometer 28, or the motion value 22 may be based on signals processed by an analog circuit before being digitized to provide a numerical value indicative of a degree of motion. Alternatively, the motion value 22 may be determined based on vehicle speed and/or vehicle acceleration (i.e. change in vehicle speed), where vehicle speed is indicated by a speedometer signal (not shown) from the vehicle 18. The motion value 22 may also be determined, all or in part, by an indication of a tilt-angle, rate of change of tilt-angle, or variation of tilt-angle of the display 12 or the vehicle 18 using a tilt-angle detector 30 installed in the personal communication device or the vehicle 18, as will be recognized by those in the art. In general, the greater the amount of motion indicated by the motion value 22, the more the disparity amount or the disparity between the left-eye image 24 and the right-eye image 26 is decreased to reduce the risk of motion sickness by the person 14 viewing the display 12. However, there are motion parameters other than the magnitude of motion that can be considered when determining how much the disparity amount should be decreased to avoid motion sickness.

Figure 2:
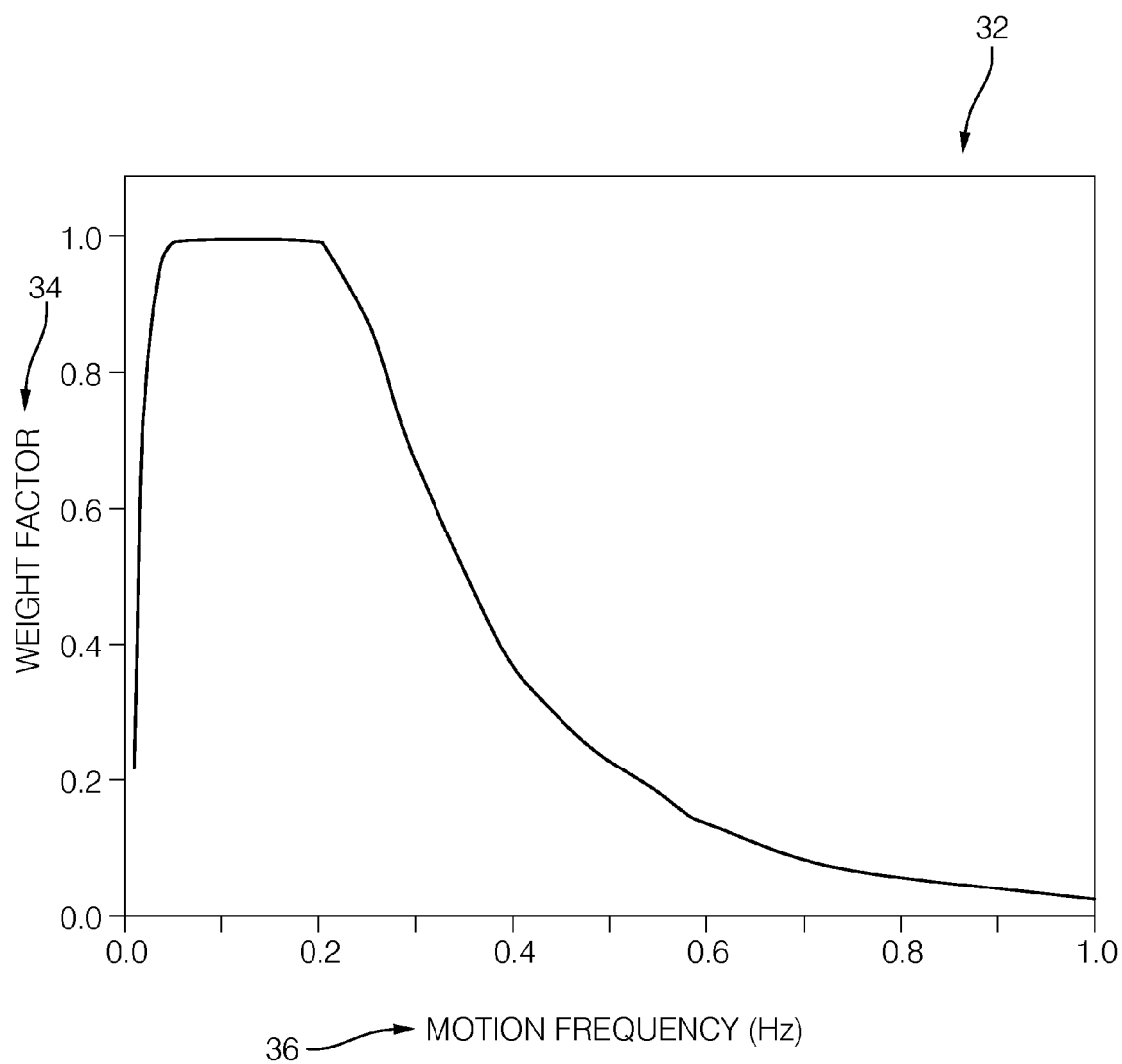
FIG. 2 is a graph of a frequency response characteristic of a filter used by the system of FIG. 1 in accordance with one embodiment.

FIG. 2 illustrates a non-limiting example of a parameter other than the magnitude of motion that may be useful when determining how much the disparity amount should be decreased to avoid motion sickness. The graph 32 is based on a study of motion sickness caused by motion at various frequencies. A normalized weight factor 34 is plotted as a function of motion frequency 36. The study is described in a paper by B. E. Donohew and M. J. Griffin, "Motion sickness: effect of the frequency of lateral oscillation," Aviation, Space, and Environmental Medicine 75 (2004) 649. The graph 32 indicates that the person 14 may be most susceptible to motion sickness if the motion frequency 36 of the motion has a frequency between about 0.05 Hz and 0.20 Hz, and substantially less susceptible at a motion frequency greater than about 0.6 Hz.

Returning to FIG. 1, the system 10 may include an image processor 40 configured to adjust incrementally a disparity amount that controls the transformation of a 3D image shown by the display 12. The image processor 40 adjusts the disparity amount based on, but not limited to, the motion value 22 in an effort to reduce motion sickness of a person 14 viewing the display 12. The image processor 40 may include a processor (not shown) such as a microprocessor or other control circuitry as should be evident to those in the art. The image processor 40 may include memory, including non-volatile memory, such as electrically erasable programmable read-only memory (EEPROM) for storing one or more routines, thresholds and captured data. The one or more routines may be executed by the processor to perform steps for determining if signals received by the image processor 40 indicate that the disparity amount of a 3D image shown on the display 12 should be decreased as described herein.

The image processor 40 is configured to adjust the disparity amount to at least one value between zero and one, one-half for example. Preferably, the image processor 40 is configured to adjust the disparity amount to more than one value between zero and one. It may also be preferable for the step size from one disparity amount to the next disparity amount to be small enough so that the disparity amount appears to the person 14 to be continuously variable from one (1) to zero (0). As used herein, continuously variable means that stepping from one value to the next is not noticeable by the person 14. The image processor 40 may also be configured to set the disparity amount to zero (0) when the motion value is greater than a motion threshold. That is, above some level or degree of motion of the display 12, the image is always a 2D image. It is also contemplated that the image processor 40 may be configured to use other anti-motion-sickness algorithms or techniques known for displaying 2D images even when the disparity amount is greater than zero, i.e. the display 12 is showing a 3D image.

Continuing to refer to FIG. 1, the system 10 may include an input control 42 configured to be operated by the person 14 to adjust a disparity gain that influences the disparity amount. It is recognized that different people have different degrees of susceptibility or immunity to motion sickness, and so the input control 42 is provided so the person 14 can customize how much the disparity amount is decreased for a particular motion indicated by the motion value 22. The control input may be implemented in a number of known ways such as, but not limited to, a rotatable knob, an icon on a touch sensitive portion of the display 12, a remote control, or an up/down pushbutton pair.

It is contemplated that a sudden change in the disparity amount may itself cause motion sickness symptoms for some persons. Accordingly, the image processor 40 may be configured to filter the motion value 22 and/or limit the rate of change of the disparity amount to prevent sudden changes in the disparity amount. By way of example and not limitation, the disparity amount may be also based on a prior disparity amount so that a low pass filter of can be applied to the disparity amount to prevent sudden changes in disparity.

Figure 4:
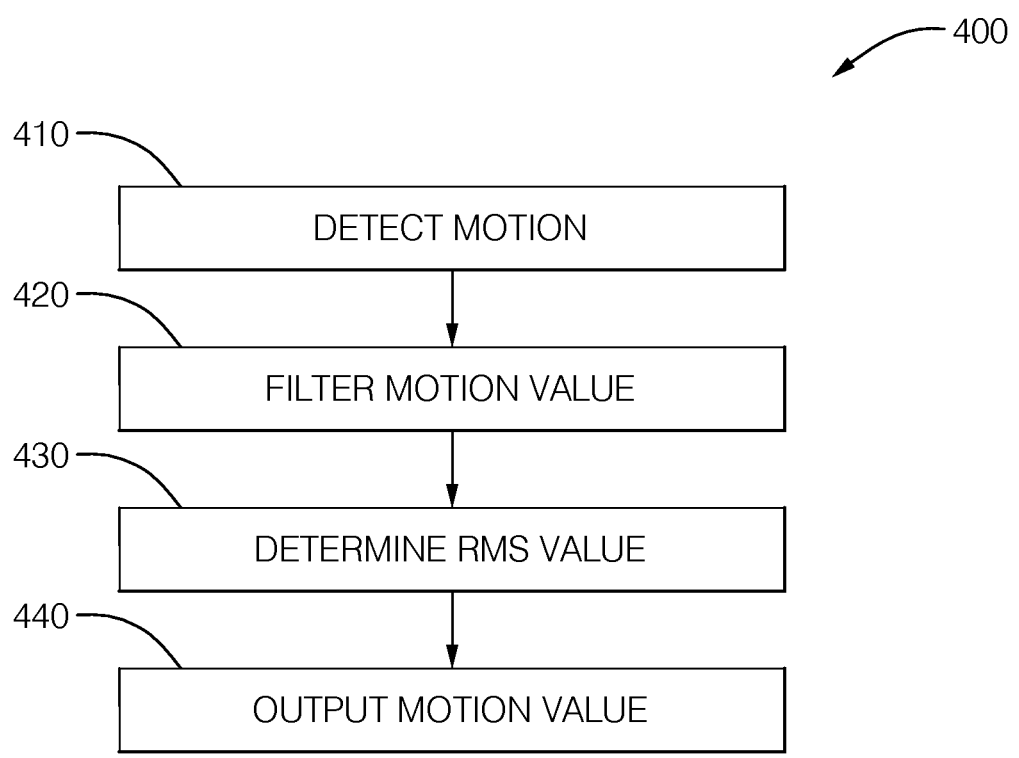
FIG. 4 is a flowchart of a method used by the system of FIG. 1 in accordance with one embodiment.

FIG. 4 illustrates a non-limiting example of a method 400 to process the analog signal from the motion detector 20. Step 410, DETECT MOTION, may include receiving a signal from a motion detector such as an accelerometer to obtain a motion value. Step 420, FILTER MOTION VALUE, may include filtering the signal output from the accelerometer with a filter having the response versus frequency characteristic shown in FIG. 2. Step 430, DETERMINE RMS VALUE, may include obtaining, processing, or averaging the filtered motion value using a root-mean-square (RMS) type detector with a time constant value T, which may for example be 3 minutes. Step 440, OUTPUT MOTION VALUE, may include outputting an RMS value from the RMS detector that is scaled by the appropriate amount to provide a suitable filtered motion value.

Figure 3:
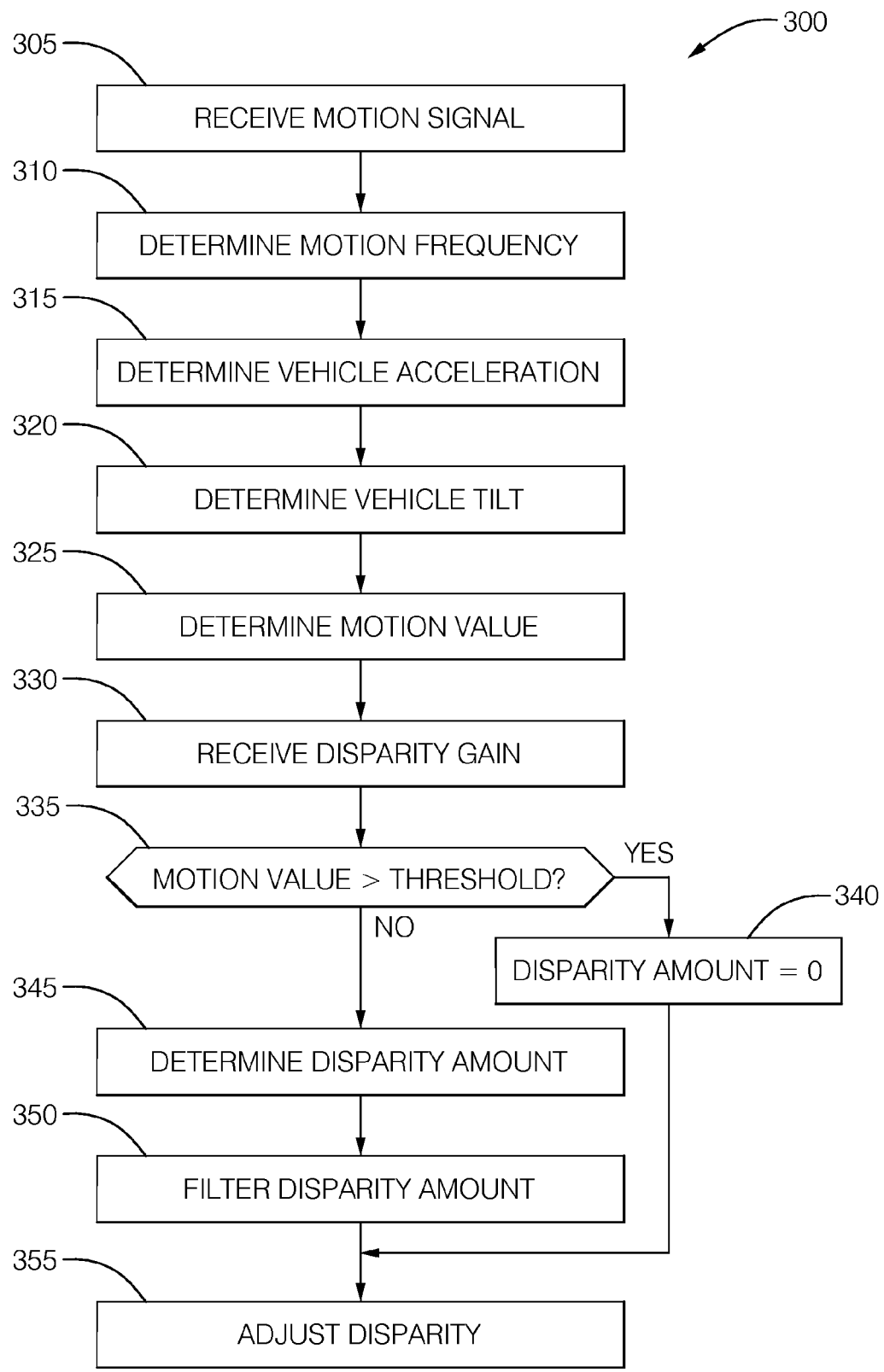
FIG. 3 is a flowchart of a method used by the system of FIG. 1 in accordance with one embodiment.

FIG. 3 illustrates a non-limiting example of a method 300 of processing a three-dimensional (3D) image shown on a display 12 of the system 10 to reduce motion sickness of a person 14 viewing the display 12. In general, the method 300 includes several optional ways to determine or estimate motion of the display 12 or motion of the person 14 viewing the display, and determines or adjusts the disparity of a 3D image shown by the system 10 in order to reduce the occurrence of motion sickness by the person 14 viewing the display 12.

Step 305, RECEIVE MOTION SIGNAL, may include the image processor 40 receiving the motion value 22 from the motion detector 20. By way of example and not limitation, the motion value 22 may be a motion signal from the accelerometer 28, and/or an angle signal from the tilt angle detector 30. Alternatively, or additionally, the motion value 22 may be determined all or in part by a speed signal from the vehicle 18 and/or a rate of change of the speed signal.

Step 310, DETERMINE MOTION FREQUENCY, is an optional step that may include determining a motion frequency based on frequency content of signals from the various sensors described above. For example, the motion value 22 may include frequency content information about a motion signal from the accelerometer 28.

Step 315, DETERMINE VEHICLE ACCELERATION, is an optional step that may include determining vehicle acceleration based on a rate of change of a speed signal from the vehicle 18. Vehicle acceleration, particularly frequent acceleration and deceleration caused by the driver varying accelerator position and/or applying the brakes, is a known cause of motion sickness for some people.

Step 320, DETERMINE VEHICLE TILT, is an optional step that may include determining a vehicle tilt angle. Variation in, either fore-and-aft tilt angle, or side-to-side tilt angle, is also a known cause of motion sickness for some people. The frequency of variation in tilt angle may also be useful to detect vehicle motion that may cause motion sickness.

Step 325, DETERMINE MOTION VALUE, is an optional step that may include determining a motion value that characterizes motion of the display 12, the person 14, or the vehicle 18. The motion value may be expressed as one or more numbers indicative of the amplitude or magnitude of the motion, the frequency of the motion, the duration of the motion, and/or variation of these characteristics.

Step 330, RECEIVE DISPARITY GAIN, is an optional step that may include the image processor 40 receiving an indication of a disparity gain from the input control 42, and further adjusting the disparity amount to process the image pair based on the disparity gain. Providing the input control 42 and configuring the image processor to account for personalization of the system 10 gives the person 14 the option to tailor how the disparity amount is adjusted based on a degree or level of susceptibility of the person 14 to motion sickness.

Step 335, MOTION VALUE>THRESHOLD?, is an optional step that may include setting the disparity amount to zero (0) when the motion value is greater than a motion threshold. If the motion value suddenly increases because, for example the vehicle has encountered a bumpy road, it may be preferable to immediately change the disparity amount to zero to avoid an onset of motion sickness. In this case, the method proceeds to step 340, DISPARITY AMOUNT=0, where the disparity is instantly set so a 2D image is displayed. If the motion value is less than the threshold, the method 300 proceeds to step 345.

Step 345, DETERMINE DISPARITY AMOUNT, may include adjusting a disparity amount used to process a 3D image shown by the display incrementally based on the motion value in order to reduce motion sickness of a person viewing the display. Adjusting the disparity amount incrementally includes adjusting the disparity amount to a value between zero and one, one-half for example. Alternatively, the disparity amount may be continuously variable from one (1) to zero (0), where continuously variable means that stepping from one value to the next is not noticeable by the person 14.

Step 350, FILTER DISPARITY AMOUNT, is an optional step that may include filtering the disparity amount based on a prior disparity amount, and thereby filtering the disparity amount to prevent sudden changes in disparity. Use of the prior disparity amount to create an infinite time filter is a known digital signal processing technique.

Step 355, ADJUST DISPARITY, may include image processor 40 receiving a 3D image signal from a 3D image source 44 such as a video player (i.e. a DVD player), or a video game console. Alternatively, the 3D image may be recalled from memory within the image processor 40 such as recalling a movie stored by the image processor 40.

Multi-view 3D displays are commercially available that interpolate between the 2D images intended for the left and right eyes. An example is a 28-view display available from Dimenco, headquartered in Veldhoven, Netherlands. The image processing needed to generate the interpolated views for such a display is equivalent to the image processing needed to implement the ADJUST DISPARITY step 355. An example of a computed intermediate view, half-way between the left-eye view and the right-eye view is given in: M. Lang, A. Hornung, O. Wang, S. Poulakos, A. Smolic, and M. Gross, "Nonlinear disparity mapping for stereoscopic 3D," ACM Transactions on Graphics 29 (2010) article 75. A video processing system capable of processing images to change disparity at 275 frames per second is described in C. Georgoulas, L. Kotoulas, G. C. Sirakoulis, I. Andreadis, and A. Gasteratos, "Real-time disparity map computation module," Microprocessors and Microsystems 32 (2008) 159. Coding schemes of 3D video have been proposed that would include depth map information as described in "ATSC planning team on 3D TV: interim report, part 2—3D technology," (Advanced Television Systems Committee, Washington, D.C., 2011). The availability of depth would further simplify the creation of intermediate views as described in C. Fehn, R. De La Barre, and S. Pastoor, "Interactive 3-DTV—concepts and key technologies," Proc. IEEE 94 (2006) 524. The entire method 300 runs for each frame of the 3D video.

Accordingly, a variable disparity three-dimensional (3D) display system (the system 10) and a method 300 of processing a three-dimensional (3D) image shown on a display to reduce motion sickness of a person viewing the display is provided. The system 10 and the method 300 provide an improvement over 3D systems that merely switch to 2D operation under certain conditions by preserving at least part of the 3D experience.

While this invention has been described in terms of the preferred embodiments thereof, it is not intended to be so limited, but rather only to the extent set forth in the claims that follow.

We claim:

1. A variable disparity three-dimensional (3D) display system, said system comprising:
   a motion detector configured to determine a motion value that characterizes motion of a display, wherein a motion signal is filtered by a weighting factor that depends on frequency to determine the motion value; and
   an image processor configured to adjust incrementally a disparity amount of a 3D image shown by the display based on the motion value in order to reduce motion sickness of a person viewing the display.

2. The system in accordance with claim 1, wherein the disparity amount is continuously variable from one (1) to zero (0).

3. The system in accordance with claim 1, wherein the disparity amount is set to zero (0) when the motion value is greater than a motion threshold.

4. The system in accordance with claim 1, wherein the system further comprises an input control configured to be operated by the person to adjust a disparity gain that influences the disparity amount.

5. The system in accordance with claim 1, wherein the disparity amount is also based on a prior disparity amount.

6. The system in accordance with claim 1, wherein the motion detector comprises an accelerometer.

7. The system in accordance with claim 1, wherein the motion value is based on a motion frequency.

8. The system in accordance with claim 1, wherein the display is installed in a vehicle.

9. The system in accordance with claim 8, wherein the motion value is based on a vehicle acceleration.

10. The system in accordance with claim 8, wherein the motion value is based on a vehicle tilt.

11. The system in accordance with claim 1, wherein the root mean square value of a time varying analog signal is obtained to determine the motion value.

12. The system in accordance with claim 1, wherein the root mean square average of a time varying analog signal over a period of time is obtained to determine a motion value.

13. A method of processing a three-dimensional (3D) image shown on a display to reduce motion sickness of a person viewing the display, said method comprising:
   determining a motion value that characterizes motion of a display, wherein determining the motion value includes filtering a motion signal by a weighting factor that depends on frequency; and
   adjusting a disparity amount of a 3D image shown by the display incrementally based on the motion value in order to reduce motion sickness of a person viewing the display.

14. The method in accordance with claim 13, wherein the disparity amount is continuously variable from one (1) to zero (0).

15. The method in accordance with claim 13, wherein adjusting the disparity amount includes setting the disparity amount to zero (0) when the motion value is greater than a motion threshold.

16. The method in accordance with claim 13, wherein the method includes receiving an indication of a disparity gain from an input control, and further adjusting the disparity amount based on the disparity gain.

17. The method in accordance with claim 13, wherein adjusting the disparity amount includes filtering the disparity amount based on a prior disparity amount.

18. The method in accordance with claim 13, wherein the method includes receiving a motion signal from an accelerometer.

19. The method in accordance with claim 13, wherein the motion signal is received from an accelerometer.

20. The method in accordance with claim 13, wherein determining the motion value includes determining a vehicle acceleration.

21. The method in accordance with claim 13, wherein determining the motion value includes determining a vehicle tilt.

22. The method in accordance with claim 13, wherein determining the motion value includes obtaining the root mean square value of a time varying analog signal.

23. The method in accordance with claim 13, wherein determining the motion value includes averaging over a period of time.

* * * * *